United States Patent [19]
Mongarli et al.

[11] Patent Number: 5,404,910
[45] Date of Patent: Apr. 11, 1995

[54] CONTROL DEVICE WHICH CAN BE FITTED TO A TAP FOR REGULATING AND CUTTING OFF A FLOW OF COMBUSTIBLE GAS

[75] Inventors: Alessandro Mongarli, Alpignana; Stefano Mongarli; Edoardo Mongarli, both of Turin, all of Italy

[73] Assignee: Italore S.p.A., Binasco, Italy

[21] Appl. No.: 122,429

[22] PCT Filed: Mar. 24, 1991

[86] PCT No.: PCT/EP92/00640
§ 371 Date: Nov. 24, 1993
§ 102(e) Date: Nov. 24, 1993

[87] PCT Pub. No.: WO92/17722
PCT Pub. Date: Oct. 15, 1992

[30] Foreign Application Priority Data
Mar. 26, 1991 [IT] Italy ............................ TO91A0214

[51] Int. Cl.6 ............................................. F16K 31/48
[52] U.S. Cl. ....................... 137/624.12; 137/624.22; 251/74
[58] Field of Search ................ 137/624.12, 624.22; 251/74

[56] References Cited
U.S. PATENT DOCUMENTS

| | | | |
|---|---|---|---|
| 2,028,933 | 1/1936 | Johnson | 137/624.22 X |
| 2,626,661 | 1/1953 | McDowell | 137/624.22 X |
| 2,837,154 | 6/1958 | Harper et al. | 137/624.22 |
| 3,104,861 | 9/1963 | Heyer | 251/43 |
| 3,820,405 | 6/1974 | Hong | 137/624.22 X |
| 4,823,838 | 4/1989 | Ferlin | 137/624.12 |

FOREIGN PATENT DOCUMENTS

| | | |
|---|---|---|
| 1112024 | 8/1961 | Germany . |
| 2200139 | 5/1973 | Germany . |
| 374028 | 8/1963 | Switzerland . |
| 586159 | 3/1947 | United Kingdom . |

*Primary Examiner*—John Rivell
*Attorney, Agent, or Firm*—Sughrue, Mion, Zinn, Macpeak & Seas

[57] ABSTRACT

The control includes a base on which a knob, which is intended to be fixed to a control member of the tap, is rotatable to regulate the gas-flow. The knob is associated with a resilient return device which is adapted to assume a preloaded configuration, in which it stores elastic energy as a result of the rotation of the knob in the sense which corresponds to the opening of the tap, and to return the knob to the position in which the tap is closed as a result of its resilient returning action. The control has a stop mechanism for restraining the resilient return device in its preloaded configuration. There is also a timing device with a release member for releasing the resilient return device from the stop mechanism.

4 Claims, 4 Drawing Sheets

CONTROL DEVICE WHICH CAN BE FITTED TO A TAP FOR REGULATING AND CUTTING OFF A FLOW OF COMBUSTIBLE GAS

BACKGROUND OF THE INVENTION

The present invention relates to a control device which can be fitted to a tap for regulating and cutting off a flow of combustible gas, particularly for domestic cookers.

More precisely, the invention relates to a control device of the type including a base on which a knob, which is intended to be fixed to a member for operating the tap, is rotatable to regulate the gas-flow.

SUMMARY OF THE INVENTION

The object of the present invention is to provide a control device of the type specified, with which it is possible to set the time for which the tap for cutting off the gas flow remains open and which automatically returns the tap to the closure position when the set time has elapsed.

The device according to the invention may be fitted either to a domestic cooker or, in general, to any gas heating appliances in which it is necessary to adjust the extent to which a tap for regulating the gas-flow is open and the time for which it remains in the open position.

A particularly advantageous characteristic of the device according to the invention is that the extent to which the tap is open can be adjusted independently of the setting of the time for which the tap remains open and the knob can be operated to regulate the gas-flow even after the time for which the tap remains open has been selected.

BRIEF DESCRIPTION OF THE DRAWINGS

Further characteristics and advantages of the present invention will become clear in the course of the detailed description which follows with reference to the appended drawings, provided purely by way of non-limiting example, in which.

DETAILED DESCRIPTION OF THE INVENTION

Figure 1:
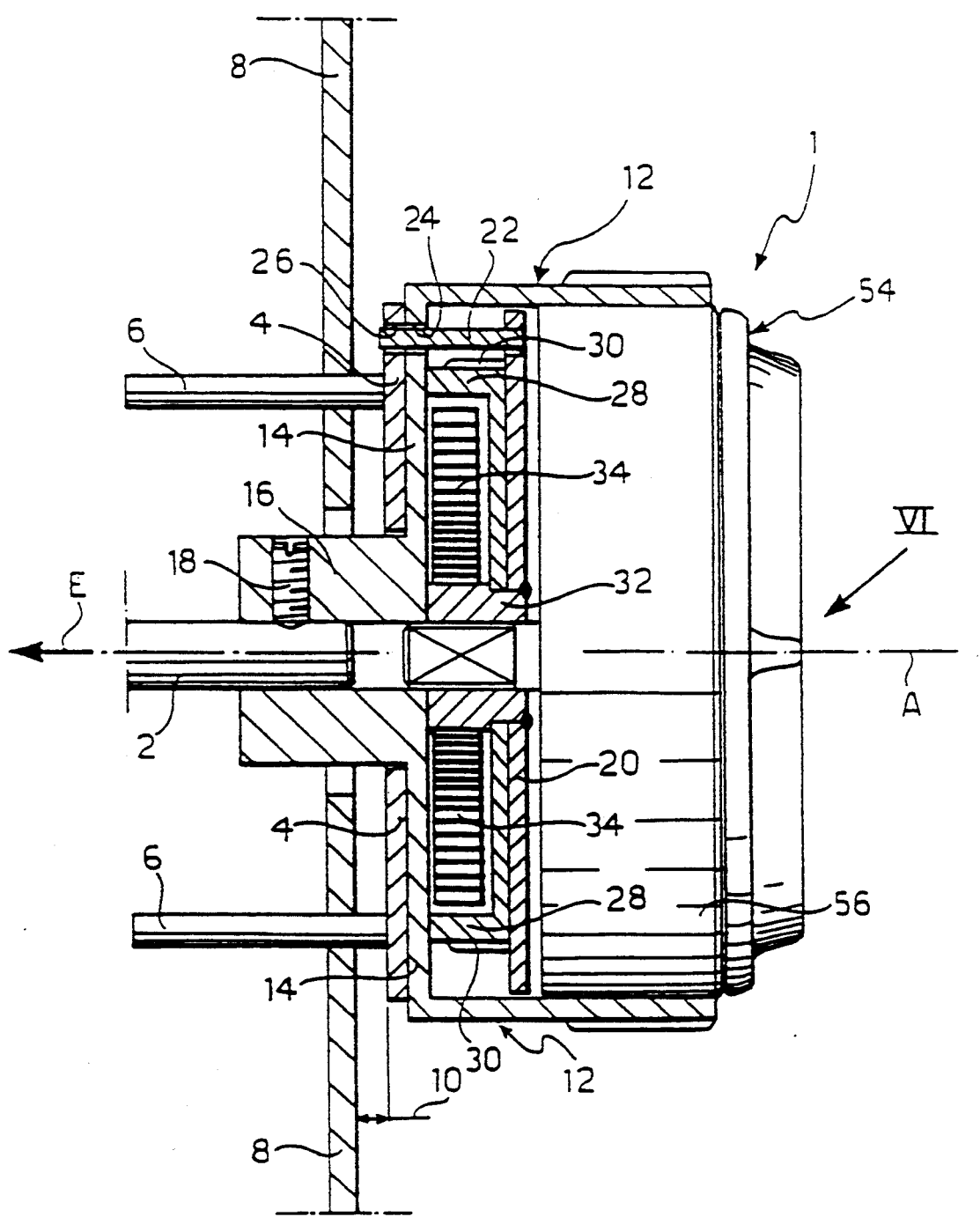
FIG. 1 is an axial section of a device according to the present invention.

With reference to the drawings, a control device for fitting to a tap for regulating and cutting off a flow of combustible gas is indicated 1. The tap has not been shown in the drawings, since it is of known type. A rod which is rotatable about an axis A to operate the tap is indicated 2 in FIG. 1.

The device 1 includes a base 4 which is constituted by an annular plate with pins 6 for fixing it to an outer surface 8 (FIG. 1) of an appliance to which the device 1 is fitted. The base 4 is fixed to the surface 8 as regards rotary movements about the axis A, but can travel a distance 10 of few millimeters along the axis A (FIG. 1).

A knob, indicated 12, is formed by a hollow cylindrical body which is rotatable on the base 4 about the axis A. The end wall 14 of the knob 12 bears against the base 4 and has a cylindrical projection 16 which extends through the base 4 and is intended to be fixed, for example, by a grub screw 18, to the rod 2 which operates the gas tap.

The knob 12 contains a circular plate 20 which is fixed to the base 4 by means of a bridge-like element 22 which extends through a slot 24 in the end wall 14 of the knob 2. The bridge-like element 22 can be fixed to the base 4 by the forcing of one of its ends into a hole 26 in the base 4.

Figure 3:
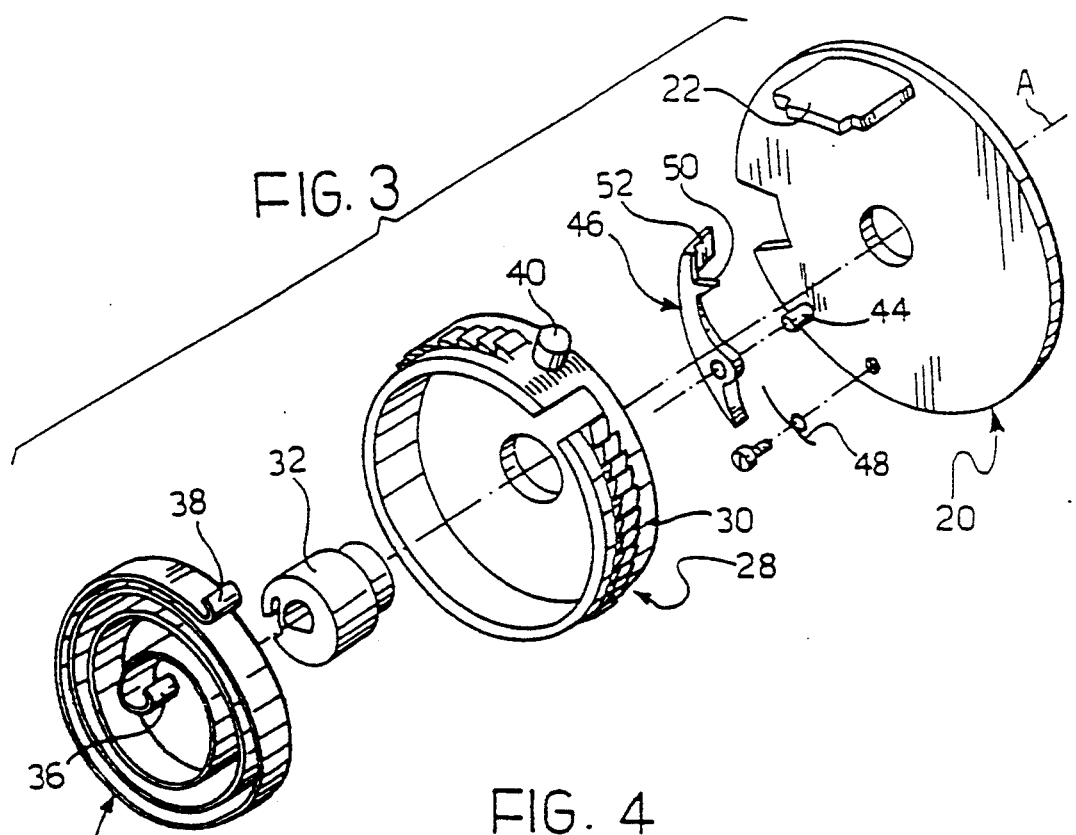
FIG. 3 is an exploded perspective view of the part indicated by the arrow III in FIG. 2, FIGS. 4 and 5 are views taken on the arrows IV and V of FIG. 2.
Figure 4:
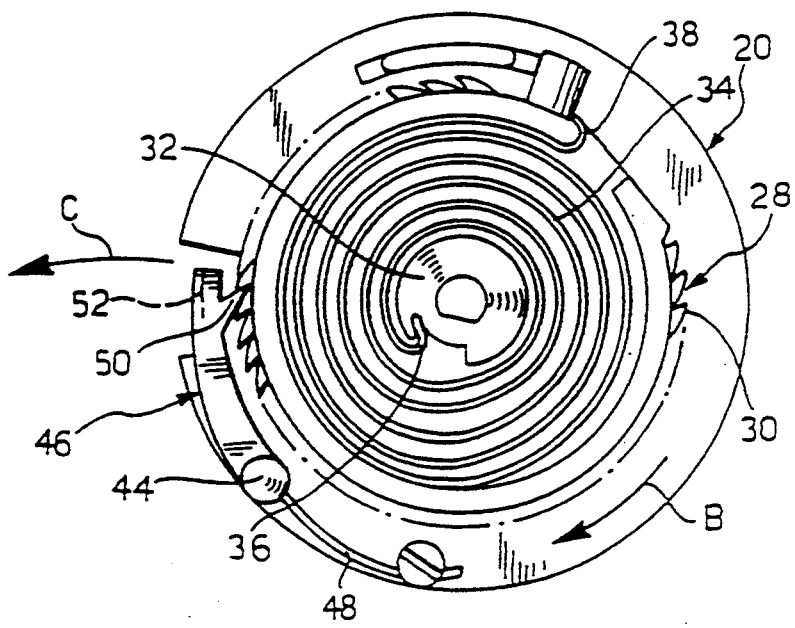

A cylindrical chamber defined between the circular plate 20 and the end wall 14 of the knob 12 houses a resilient return device and a stop mechanism which will now be described with particular reference to FIGS. 3 and 4.

Figure 2:
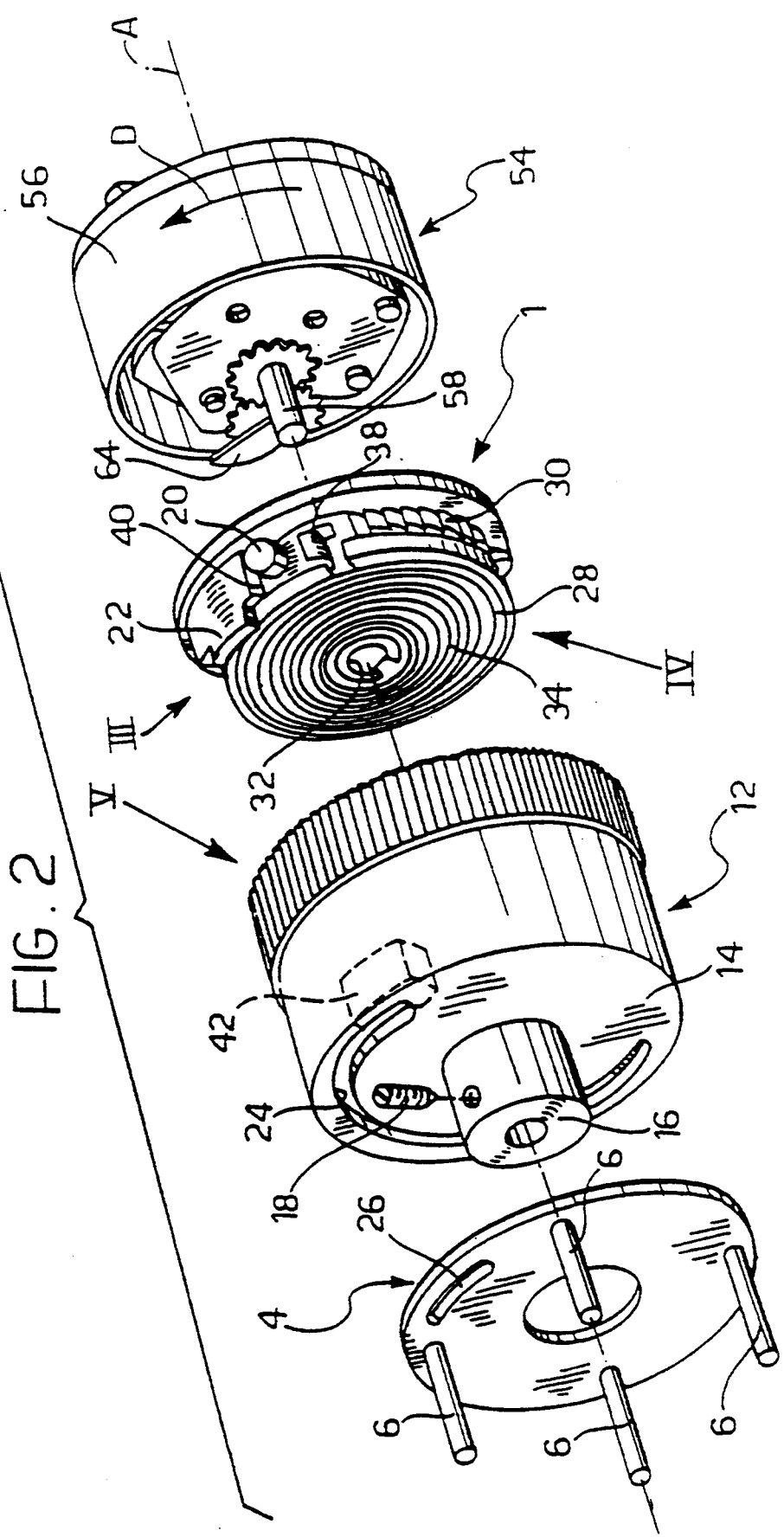
FIG. 2 is an exploded perspective view of the device of FIG. 1.
Figure 5:
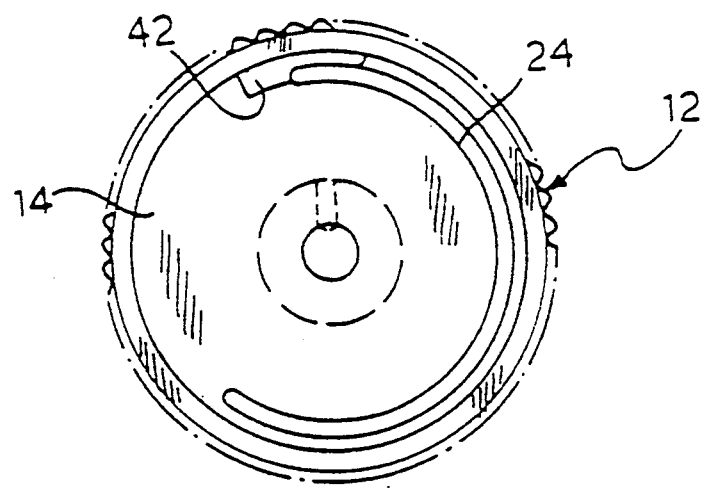

A ring 28 mounted on the circular plate 20 has teeth 30 with saw-toothed profiles on its outer surface. The ring 28 is connected to the plate 20 by a pin 32 which is fixed to the circular plate 20 so that the ring 28 is free to rotate about the axis A. Within the ring 28 is a spiral spring 34 with a first end 36 which is fixed to the pin 32 and a second end 38 which is fixed to the ring 28. The ring 28 has a radial projection 40 which is intended to bear against a corresponding projection 42 (see FIGS. 2 and 5) in the knob 12.

Again with reference to FIGS. 3 and 4, the plate 20 carries a pin 44 to which a stop member 46 is articulated, the stop member 46 being urged by a spring 48 towards a position in which a tooth 50 thereof engages the teeth 30 of the ring 28. The stop member 46 also has an appendage 52 which extends beyond the far side of the plate 20 from the stop member 46. The teeth 30 on the ring 28 and the tooth 50 of the stop member 46 are shaped so that the ring 28 can rotate in the sense indicated by the arrow B in FIG. 4, but is prevented from rotating in the opposite sense. The sense B corresponds to the sense in which the spiral spring 34 is coiled. Action on the appendage 52 of the stop member 46 in the direction indicated by the arrow C in FIG. 4 releases the stop member 46 from the teeth 30.

Figure 6:
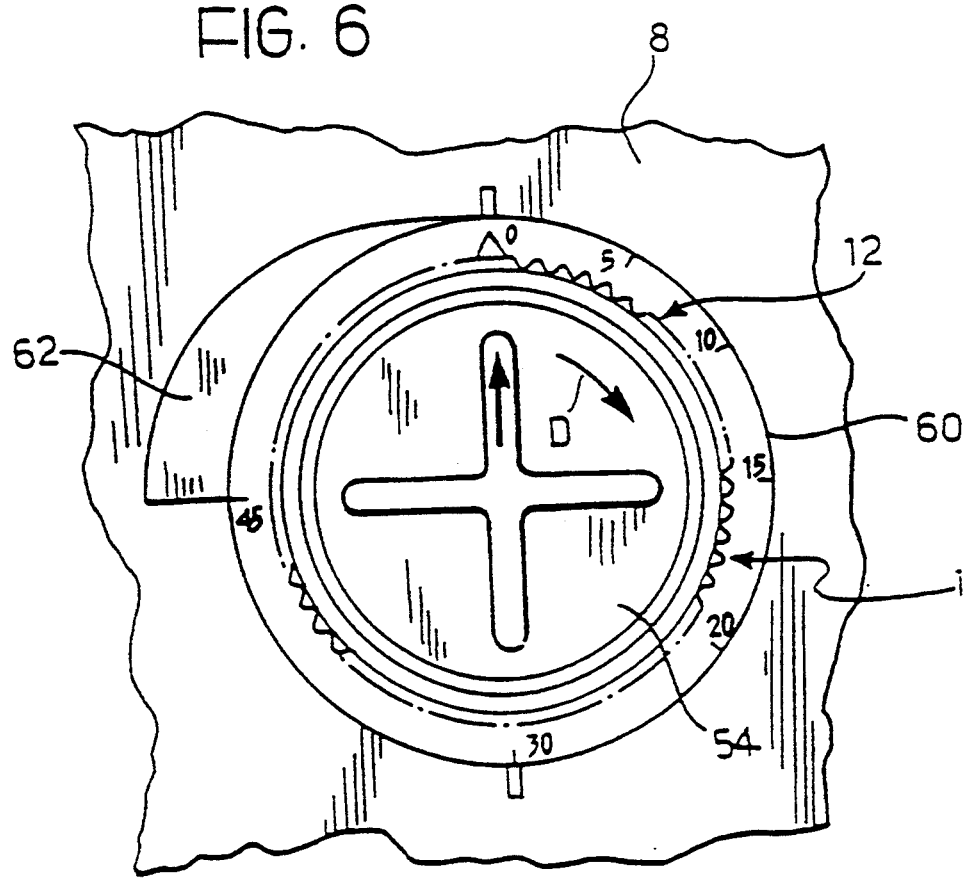
FIG. 6 is a view taken on the arrow VI of FIG. 1.

With reference again to FIG. 2, a timing device, indicated 54, includes a cylindrical casing 56 housing a programmable clock mechanism. The mechanism of the timing device 54 is not described in detail, since it is of known type and is easily obtainable commercially. For the purposes of the present description, it suffices to point out that the clock mechanism includes a shaft 58 which extends along the axis A and is fixed to the circular plate 20 which in turn is fixed to the base 4 by the bridge-like element 22. The casing 56 of the timing device 54 is rotatable about the shaft 58 and the rotation of the casing 56 in the sense indicated by the arrow D in FIGS. 2 and 6 sets the time for which the gas tap remains open. As can be seen in FIG. 6, the surface 8 of the appliance to which the device 1 is fitted may have a graduated scale 60 indicating the opening times of the tap which can be set by the device 54. The surface 8 may also have a scale 62 indicating the gas flow-rate set by the knob 12.

The clock mechanism of the timing device 54 also includes a release member 64 (see FIG. 2) for cooperating with the appendage 52 of the stop member 46.

The device according to the invention operates as follows.

In order to open the gas tap, the knob 12 is rotated anticlockwise (with reference to FIG. 6). In order to prevent accidental opening, gas taps normally have safety devices which enable the operating rod 2 to be rotated only after it has been moved in the direction indicated by the arrow E. Before the knob 12 is rotated, it must therefore be moved a short distance in the direction E which is possible because the base 4 is movable relative to the surface 8 along the axis A. The gas-flow, and hence the desired intensity of the flame, can be regulated by the rotation of the knob 12.

During the rotation of the knob in the sense in which it opens the tap, the projection 42 of the knob 12 comes into contact with the projection 40 on the ring 28. The rotation of the knob 12 thus causes the ring 28 to rotate in the sense in which the spiral spring 34 is coiled. The stop member 46 prevents the ring 28 from returning under the resilient return action of the spring 34. The spring 34 is thus kept in a preloaded configuration by the stop mechanism constituted by the member 46 and the teeth 30 on the ring 28. The projection 40 on the ring 28 does not prevent the knob 12 from rotating in the sense which corresponds to the closure of the gap tap (clockwise in FIG. 6).

During the rotation of the knob in the sense in which it opens the tap, the spring 34 stores enough elastic energy to return the knob 12 to the closure position when the ring is released from the stop member 46.

The clockwise rotation of the casing 56 of the timing device 54 sets the time for which the gas tap remains open. After the opening time has been set, it is still possible to adjust the intensity of the flame by means of the knob 12. In fact, as seen above, the knob 12 can be rotated freely in the sense in which it closes the tap and its rotation in the sense in which it opens the tap causes a further rotation of the ring 28 and the storage of further elastic energy in the spring 34.

The clock mechanism of the timing, device 54, which is loaded by the rotation of the casing 56, causes the casing 56 to return gradually anticlockwise with reference to FIG. 6. When the time set by the timing device 54 has elapsed, the release member 64 of the clock mechanism acts on the appendage 52 of the stop member 46 and moves the tooth 50 away from the teeth 30. The ring 28 is thus free to rotate anticlockwise with reference to FIG. 4, as a result of the resilient returning action of the spring 34.

During the rotation of the ring, the projection 40 of the ring 28 acts against the projection 42 of the knob 12 and causes it to rotate in the sense in which it closes the gas tap. The knob 12 stops in the position in which the tap is closed.

What is claimed is:

1. A control device which can be fitted to a tap for regulating and cutting off a flow of combustible gas, particularly for domestic cookers, including a base (4) on which a knob (12), which is intended to be fixed to a member (2) for operating the tap, is rotatable to regulate the gas-flow, including:

a resilient return device (34, 28) which cooperates with the knob (122) and is adapted to assume a preloaded configuration in which it stores elastic energy as a result of the rotation of the knob (12) in the sense which corresponds to the opening of the tap and to return the knob (12) to the position in which the tap is closed as a result of its resilient returning action, a stop mechanism (30, 46) for restraining the resilient return device (34, 28) in its preloaded configuration, and an adjustable timing device (54) with a release member (64) for releasing the resilient return device (34, 28) from the stop mechanism (46, 30), wherein the knob (12) is rotatably disengaged from the stop mechanism (30, 46), so that the knob (12) can be operated to regulate the gas-flow independently of the setting of the time for which the tap remains open, and wherein the resilient return device includes a spiral spring (34) which is coiled coaxially around the axis of rotation (A) of the knob (12), the spring (34) having a first end (36) which is fixed relative to the base (4) and a second end (38) which is fixed to a rotary ring (28) which has a projection (40) for cooperating with and bearing against a corresponding projection (42) on the knob (12).

2. A device according to claim 1, wherein the ring (28) has a plurality of teeth (30) with saw-tooth profiles for cooperating with a stop member (46) which is urged resiliently towards a position in which it engages the teeth (30) of the ring (28), the release member (64) of the timing device (54) being adapted to release the stop member (46) from the teeth (30) of the ring (28).

3. A device according to claim 1, wherein the timing device (54) includes a cylindrical casing (56) which is rotatable relative to the knob (12) about the same axis of rotation (A) as the knob (12), the casing (56) housing a clock mechanism which includes a shaft (58) which is fixed to the base (4).

4. A device according to claim 2, wherein the knob (12) is in the form of a hollow cylindrical body with an end wall (14) whose surface which faces outwardly of the knob (12) bears on the base (4), the knob (12) containing a circular plate (20) fixed to the base (4) by a bridge-like element (22) which extends through a slot (24) in the end wall (14) of the knob (12), the ring (28) being housed in a cylindrical chamber defined between the circular plate (20) and the end wall (14) of the knob (12).

* * * * *